United States Patent
Do (10) Patent No.: US 8,165,105 B2
(45) Date of Patent: Apr. 24, 2012

(54) APPARATUS AND METHOD FOR CELL SEARCHING IN WIRELESS COMMUNICATION SYSTEM

(75) Inventor: Joo-Hyun Do, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 805 days.

(21) Appl. No.: 12/262,981

(22) Filed: Oct. 31, 2008

(65) Prior Publication Data

US 2009/0116459 A1    May 7, 2009

(30) Foreign Application Priority Data

Nov. 2, 2007   (KR) .................. 10-2007-0111265

(51) Int. Cl.
    *H04J 3/06*    (2006.01)
(52) U.S. Cl. ............................................. 370/350

(58) Field of Classification Search .......... 370/328–338; 455/403–466
See application file for complete search history.

(56) References Cited

U.S. PATENT DOCUMENTS

| | | | |
|---|---|---|---|
| 2008/0107086 A1* | 5/2008 | Fukuta et al. | 370/335 |
| 2008/0285433 A1* | 11/2008 | Akita et al. | 370/204 |
| 2009/0086669 A1* | 4/2009 | McCoy et al. | 370/329 |
| 2010/0182979 A1* | 7/2010 | Malladi et al. | 370/336 |

* cited by examiner

*Primary Examiner* — Hassan Kizou
*Assistant Examiner* — Charles C Jiang
(74) *Attorney, Agent, or Firm* — Jefferson IP Law, LLP (57) ABSTRACT

An apparatus and method for mapping a cell IDentifier (ID) for cell searching in a transmitter of a wireless communication system are provided. The method includes generating a single type of complex sequences mapped with a cell ID, and transmitting the complex sequences mapped with the cell ID to synchronization channels periodically transmitted in each slot of a physical frame.

19 Claims, 12 Drawing Sheets

APPARATUS AND METHOD FOR CELL SEARCHING IN WIRELESS COMMUNICATION SYSTEM

PRIORITY

This application claims the benefit under 35 U.S.C. §119 (a) of a Korean patent application filed in the Korean Intellectual Property Office on Nov. 2, 2007 and assigned Serial No. 10-2007-0111265, the entire disclosure of which is hereby incorporated by reference.

BACKGROUND OF THE INVENTION

1. Field of the Invention

The present invention relates to an apparatus and method for cell searching in a wireless communication system. More particularly, the present invention relates to an apparatus and method for performing cell searching based on a single type of complex sequences in an asynchronous wireless communication system in which a time synchronization of a base station is not required.

2. Description of the Related Art

A Wideband Code Division Multiple Access (WCDMA) system and a Long Term Evolution (LTE) system whose standardization is in progress are currently being commercialized as asynchronous communication systems. Since timing synchronization of a base station is not considered in the asynchronous communication systems, the asynchronous communication systems perform a significantly complex cell search operation in comparison with synchronous communication systems. The cell search operation is carried out to search for a cell IDentifier (ID) and to obtain a timing of a received signal. The cell ID is a code for identifying a cell to which a mobile station belongs.

The WCDMA system performs the cell search operation in three steps, that is, slot timing synchronization acquisition, frame timing synchronization and cell group ID detection, and cell ID detection. The LTE system performs the cell search operation in three steps, that is, slot synchronization and sub-cell ID detection, frame synchronization and cell group ID detection, and cell ID detection.

Since the three steps of the cell search operation are performed in the conventional asynchronous wireless communication system, different types of sequences having different characteristics are used for each step of the cell search operation in order to obtain detailed timing information and cell ID information. For example, for each step, the WCDMA system uses a Golay sequence, a Hadamard sequence, a code group sequence, and a gold sequence. In addition, for each step, the LTE system uses a Zadoff-Chu sequence, an m-sequence, a 2 Dimensional (2D) orthogonal sequence, and a 2D pseudo-random sequence.

When the different types of sequences having different structures and different characteristics are used for each step in the wireless communication system as described above, a receiver is equipped with a correlation unit and a sequence generator depending on each sequence in order to perform signal acquisition and detection. Therefore, there is a problem in that the complexity of implementation increases.

SUMMARY OF THE INVENTION

An aspect of the present invention is to address at least the above-mentioned problems and/or disadvantages and to provide at least the advantages described below. Accordingly, an aspect of the present invention is to provide an apparatus and method for cell searching in a wireless communication system.

Another aspect of the present invention is to provide an apparatus and method for cell searching to reduce the complexity of hardware implementation in a wireless communication system.

Another aspect of the present invention is to provide an apparatus and method for performing cell searching by using a single type of complex sequences in a wireless communication system.

In accordance with an aspect of the present invention, a method of mapping a cell IDentifier (ID) for cell searching in a transmitter of a wireless communication system is provided. The method includes generating a single type of complex sequences mapped with a cell ID, and transmitting the complex sequences mapped with the cell ID to synchronization channels periodically transmitted in each slot of a physical frame.

In accordance with another aspect of the present invention, a method of cell searching in a receiver of a wireless communication system is provided. The method includes detecting a root sequence by performing correlation for a first synchronization channel periodically received in each slot of a physical frame, obtaining a first part of a cell ID from the root sequence, detecting a complex sequence which is a same type as the root sequence by performing correlation for a second synchronization channel periodically received in each slot of the physical frame, and obtaining a second part of the cell ID by using the complex sequence detected from the second synchronization channel.

In accordance with yet another aspect of the present invention, an apparatus for mapping a cell ID for cell searching in a transmitter of a wireless communication system is provided. The apparatus includes a complex sequence generator for generating a single type of complex sequences mapped with a cell ID, and a resource mapper for transmitting the complex sequences mapped with the cell ID to synchronization channels periodically transmitted in each slot of a physical frame.

In accordance with still another aspect of the present invention, an apparatus for cell searching in a receiver of a wireless communication system is provided. The apparatus includes a first synchronization channel detector for obtaining a root sequence by performing correlation for a first synchronization channel periodically received in each slot of a physical frame and for obtaining a first part of a cell ID from the obtained root sequence, and a second synchronization channel detector for detecting a complex sequence which is a same type as the root sequence by performing correlation for a second synchronization channel periodically received in each slot of the physical frame and for obtaining a second part of the cell ID by using the detected complex sequence.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions or constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Hereafter, exemplary embodiments of the present invention describe an apparatus and method for performing cell searching based on a single type of complex sequences in an asynchronous wireless communication system in which a time synchronization of a base station is not required. Although cell searching is performed by a wireless communication system using a complex asynchronous scheme in this disclosure as an example, the present invention can also be applied to other types of communication systems having similar technical backgrounds and channel formats.

Figure 1:
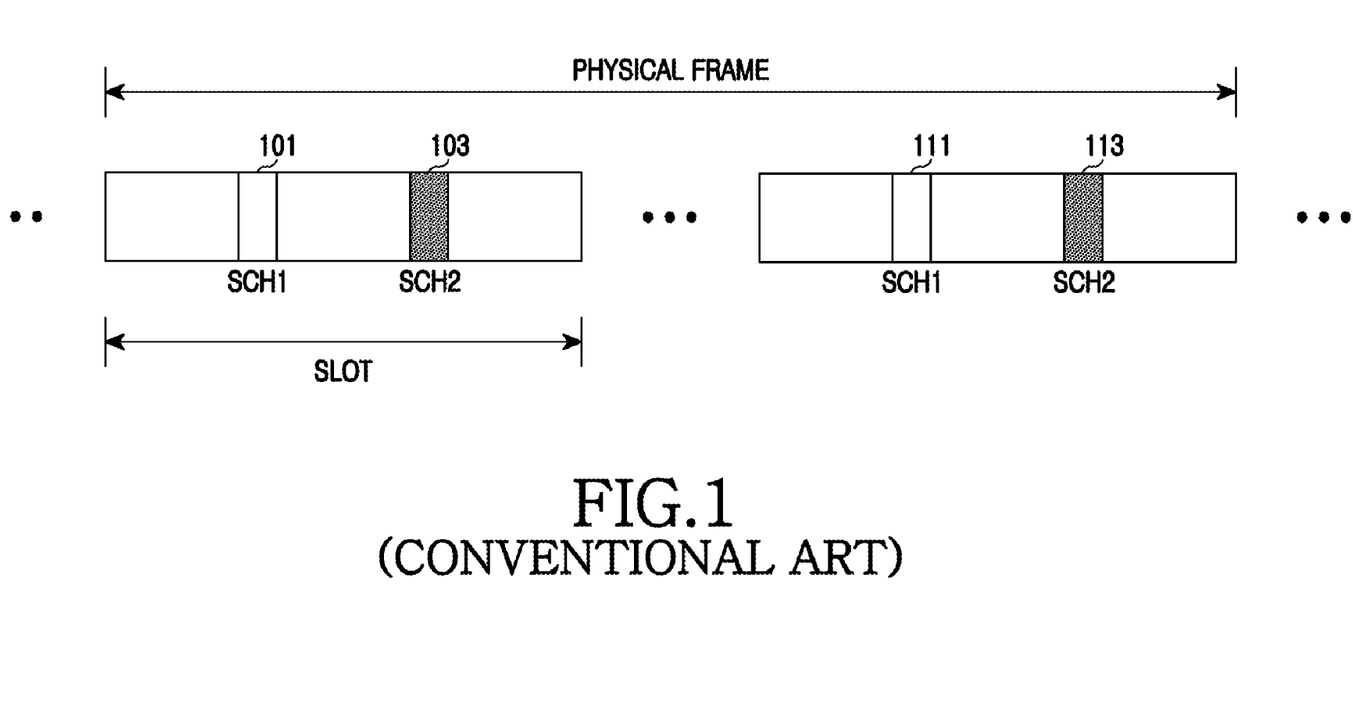
FIG. 1 illustrates a conventional structure of a frame transmitted in a physical frame unit.

FIG. 1 illustrates a conventional structure of a frame transmitted in a physical frame unit. It is assumed that a signal used for cell searching is transmitted periodically with a specific time interval and has a structure of a physical frame unit including an arbitrary number of slots as illustrated in FIG. 1.

Referring to FIG. 1, Synchronization CHannels (SCHs) are used for cell searching. First SCHs 101 and 111 and second SCHs 103 and 113 are periodically transmitted with a specific interval through an arbitrary slot in a physical frame. Hereinafter, the first SCH is referred to as 'SCH1', and the second SCH is referred to as 'SCH2'. Locations of the SCHs in the physical frame may vary depending on a system characteristic.

In general, the larger the number of cell IDentifiers (IDs) in use, the easier the cell planning. Thus, a plurality of cell IDs are considered to be used in a system design process. For effective cell ID detection, information on the plurality of cell IDs is expressed by combining two parts of the information. That is, a transmitter transmits the cell ID by dividing the cell ID into two parts, and a receiver combines the divided two parts to obtain information on the cell ID of a cell to which the receiver belongs. For example, if M cell IDs exist, M cells can be expressed by combining X and Y, where X represents a first part and Y represents a second part.

The transmitter transmits a complex sequence in which first and second parts of a cell ID are mapped in the SCH1s 101 and 111 and the SCH2s 103 and 113. The receiver detects slot timing and the first part of the cell ID through the SCH is 101 and 111, and detects frame timing and the second part of the cell ID through the SCH2s 103 and 113.

The complex sequence has a format in which a phase component has a unique sequence feature expressed by Equation (1) below. Other sequences having the characteristic of Equation (1) below can also be used by combining difference sequences. The complex sequence has a substantially constant amplitude and cyclic periodicity.

A basic sequence structure in which a phase component has a sequence feature is illustrated in Equation (1) below.

$$Seq_k = CW_N^{k+(k+A)/B+q \cdot k} \qquad (1)$$

$$W_N = \exp\left(j\frac{2\pi p}{N}\right) \text{ or } W_N = \exp\left(-j\frac{2\pi p}{N}\right)$$

In Equation (1), $Seq_k$ denotes a $k^{th}$ sequence, N denotes a sequence length, p denotes a sequence index, and q denotes a cyclic shift index. In addition, A, B, and C are constant values. Examples of the sequence having the characteristic of Equation (1) include a Constant Amplitude Zero Auto-Correlation (CAZAC) sequence and a poly-phase sequence in which a phase component has a sequence feature. The CAZAC sequence may be a Frank sequence, a Zadoff-Chu sequence, a Generalized Chirp Like (GCL) sequence, etc.

A sequence transmitted in the SCH1s 101 and 111 has the sequence length N, the sequence index P, and the cyclic shift index q. The first part of the cell ID is mapped to the sequence index. The sequence transmitted in the SCH1s 101 and 111 is used as a reference for a sequence transmitted in the SCH2s 103 and 113, and is referred to as a root sequence.

Two complex sequences, whose cyclic shift indices are arbitrarily different from the root sequence transmitted in the SCH1, are transmitted in the SCH2s 103 and 113. The second part of the cell ID is mapped to the difference between the cyclic shift indices. In order to prevent the sequence transmitted in the SCH2s 103 and 113 from being detected in an initial cell searching operation, scrambling may be performed on the two complex sequences transmitted in the SCH2s 103 and 113.

In a method to be described below, a transmitter transmits a cell ID and a receiver searches for the cell ID by using a complex sequence having the characteristic of Equation (1) above according to the frame structure of FIG. 1.

Figure 2:
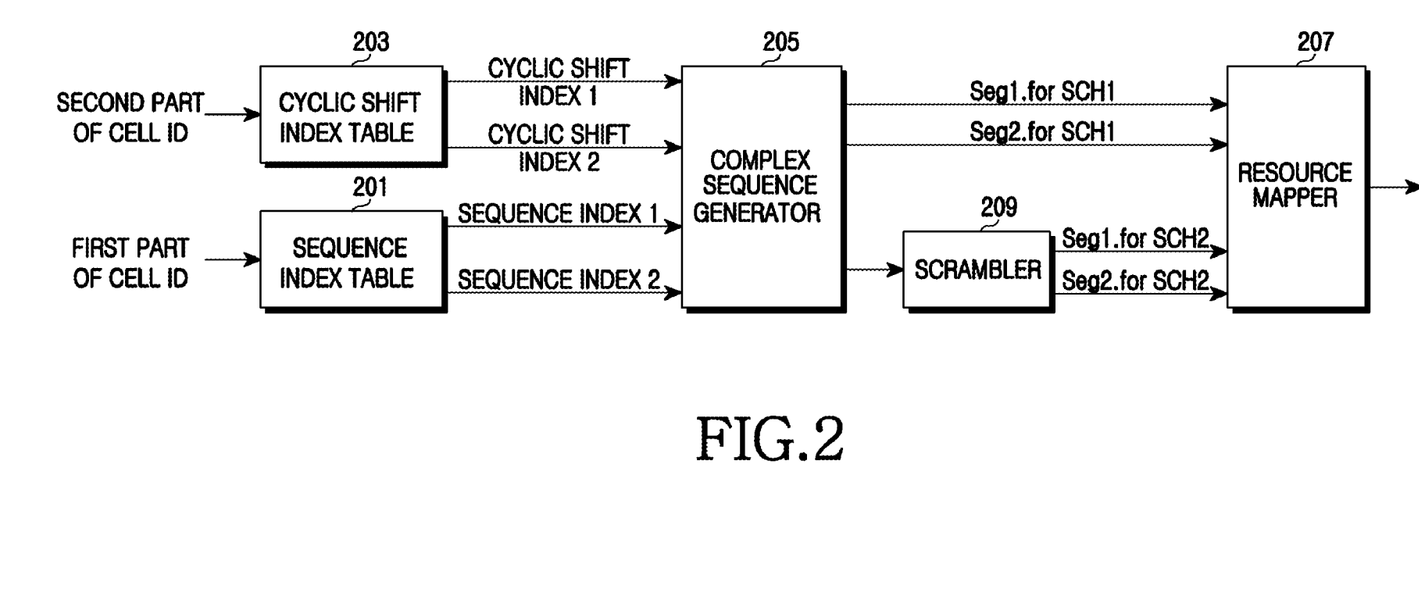
FIG. 2 is a block diagram of a transmitter for transmitting a cell IDentifier (ID) in a wireless communication system according to an exemplary embodiment of the present invention.

FIG. 2 is a block diagram of a transmitter for transmitting a cell ID in a wireless communication system according to an exemplary embodiment of the present invention.

Referring to FIG. 2, the transmitter includes a sequence index table 201, a cyclic shift index table 203, a complex sequence generator 205, a resource mapper 207, and a scrambler 209.

The sequence index table 201 receives a first part of the cell ID, maps the first part to an index of a complex sequence, and provides the mapping result to the complex sequence generator 205. The sequence index table 201 may map the first part of the cell ID to one sequence index or two sequence indices according to a cell ID mapping scheme.

The cyclic shift index table 203 receives a second part of the cell ID, maps the second part to a cyclic shift index of the complex sequence, and provides the mapping result to the complex sequence generator 205.

The complex sequence generator 205 generates a root sequence and two complex sequences depending on the root sequence by using mapping information provided from the sequence index table 201 and the cyclic shift index table 203. Thereafter, the complex sequence generator 205 outputs the root sequence to the resource mapper 207, and outputs the two complex sequences to the scrambler 209.

When one sequence index is provided from the sequence index table 201 according to the cell ID mapping scheme, the complex sequence generator 205 generates a root sequence having the sequence index and generates two complex sequences having a cyclic shift index that is different by a specific value from the root sequence. When two sequence indices are provided from the sequence index table 201 according to the cell ID mapping scheme, the complex sequence generator 205 generates two root sequences and generates two complex sequences having cyclic shift indices that are different by specific values respectively from the two root sequences.

The resource mapper 207 performs mapping so that the root sequence(s) provided from the complex sequence generator 205 is transmitted in the SCH1s 101 and 111 on the physical channel of FIG. 1. The resource mapper 207 also performs mapping so that the two scrambled complex sequences provided from the scrambler 209 are transmitted respectively in the SCH2s 103 and 113.

When one root sequence is generated according to a resource mapping scheme, the resource mapper 207 performs mapping so that the one root sequence is repeatedly transmitted in the SCH is 101 and 111 and performs mapping so that the two complex sequences are alternately transmitted respectively in the SCH2s 103 and 113. When two root sequences are generated according to the resource mapping scheme, the resource mapper 207 performs mapping so that the two root sequences are repeatedly transmitted respectively to the SCH1s 101 and 111 and also performs mapping so that the two complex sequences are repeatedly transmitted in the SCH2s 103 and 113 in the same slots as the root sequences.

The scrambler 209 performs scrambling on the two complex sequences so that the two complex sequences provided from the complex sequence generator 205 are not detected in the initial cell searching operation. Then, the scrambler 209 outputs the scrambling result to the resource mapper 207.

Figure 3:
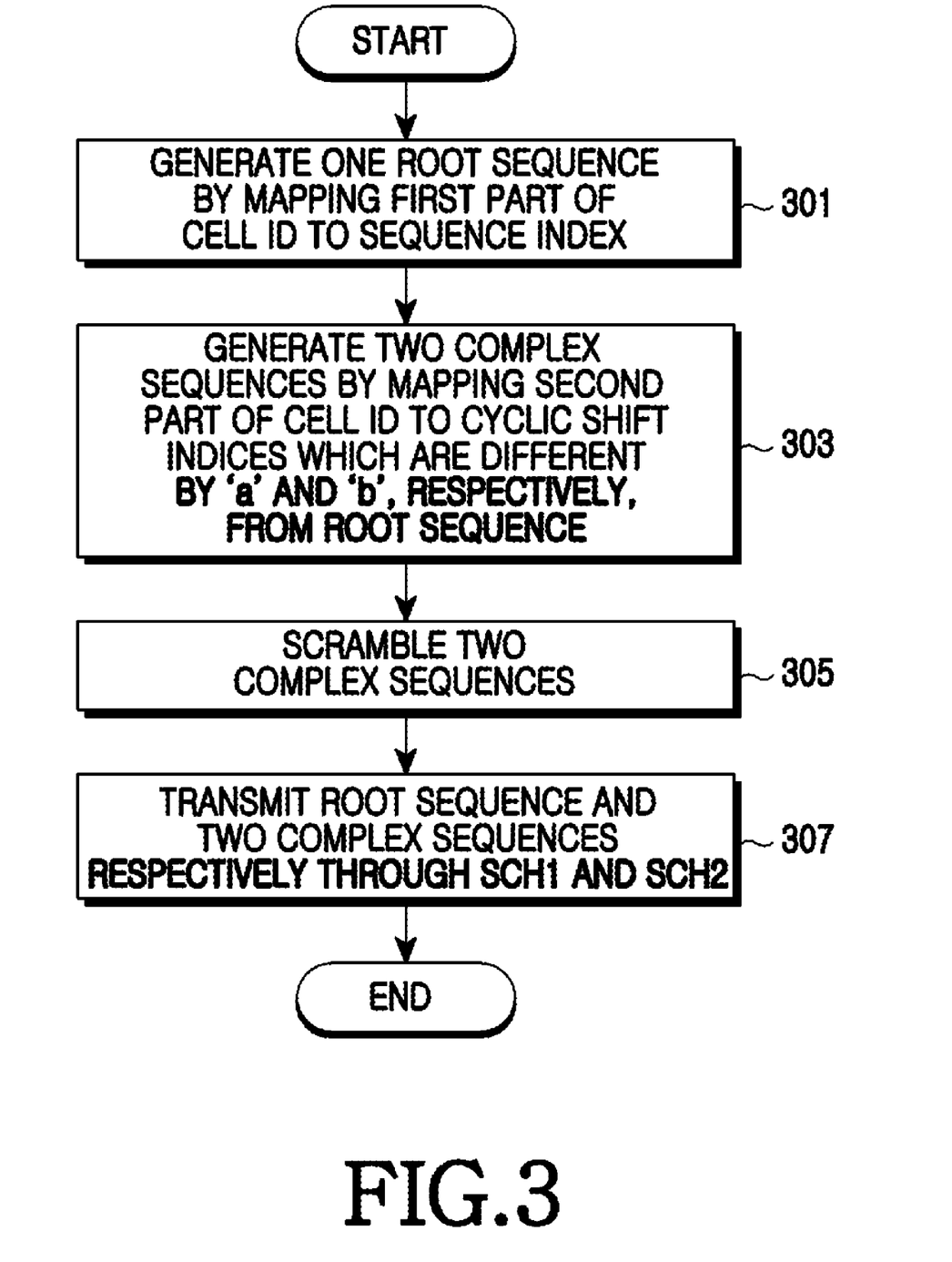
FIG. 3 is a flowchart illustrating a process of transmitting a complex sequence mapped with a cell ID in a transmitter of a wireless communication system according to an exemplary embodiment of the present invention.

FIG. 3 is a flowchart illustrating a process of transmitting a complex sequence mapped with a cell ID in a transmitter of a wireless communication system according to an exemplary embodiment of the present invention.

Referring to FIG. 3, in step 301, the transmitter generates one root sequence by mapping a first part of the cell ID to a sequence index. In step 303, the transmitter generates two complex sequences by mapping a second part of the cell ID to cyclic shift indices which are different by 'a' and 'b', respectively, from the root sequence.

In step 305, the transmitter scrambles the two complex sequences. In step 307, the transmitter performs mapping so that the root sequence is continuously transmitted in the SCH1 on the physical channel of FIG. 1 and performs mapping so that the two complex sequences are alternately transmitted in the SCH2 on the physical channel of FIG. 1. For example, the transmitter continuously transmits the root sequence in the SCH1s 101 and 111 for respective slots. In addition, among the two complex sequences, the transmitter transmits a first complex sequence which is different by 'a' from the root sequence in the SCH2 103 of a first slot, and transmits a second complex sequence which is different by 'b' from the root sequence in the SCH2 113 of a second slot. Thereafter, the procedure of FIG. 3 ends.

Figure 4:
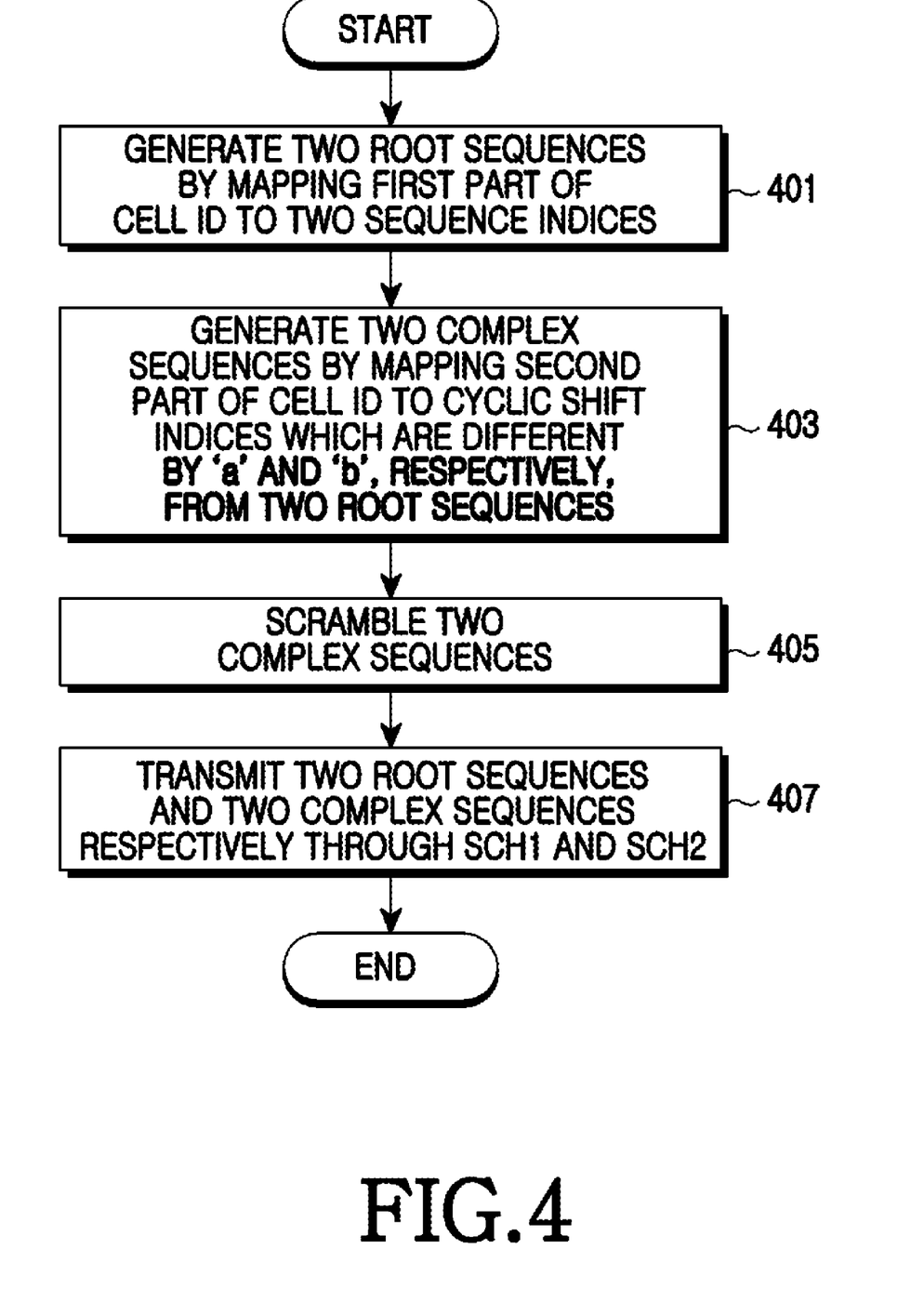
FIG. 4 is a flowchart illustrating a process of transmitting a complex sequence mapped with a cell ID in a transmitter of a wireless communication system according to another exemplary embodiment of the present invention.

FIG. 4 is a flowchart illustrating a process of transmitting a complex sequence mapped with a cell ID in a transmitter of a wireless communication system according to another exemplary embodiment of the present invention.

Referring to FIG. 4, in step 401, the transmitter generates two root sequences by mapping a first part of the cell ID to two sequence indices. In step 403, the transmitter generates two complex sequences by mapping a second part of the cell ID to cyclic shift indices which are different by 'a' and 'b', respectively, from the two root sequences. More specifically, if the two root sequences are respectively a first root sequence and a second root sequence, a first complex sequence is generated by mapping the second part to the cyclic shift index which is different by 'a' from the first root index, and a second complex sequence is generated by mapping the second part to the cyclic shift index which is different by 'b' from the second root sequence.

In step 405, the transmitter scrambles the two complex sequences. In step 407, the transmitter performs mapping so that the root sequences are alternately transmitted in the SCH1 on the physical channel of FIG. 1, and performs mapping so that the two complex sequences are transmitted in the SCH2 in the same slots as the root sequences. For example, when the transmitter transmits the first root sequence in the SCH1 101 of the first slot and transmits the second root sequence in the SCH2 111 of the second slot, the first complex sequence which is different by 'a' from the first root sequence is transmitted in the SCH2 103 of the first slot, and the second complex sequence which is different by 'b' from the second sequence is transmitted in the SCH2 113 of the second slot.

Thereafter, the procedure of FIG. 4 ends.

Figure 5:
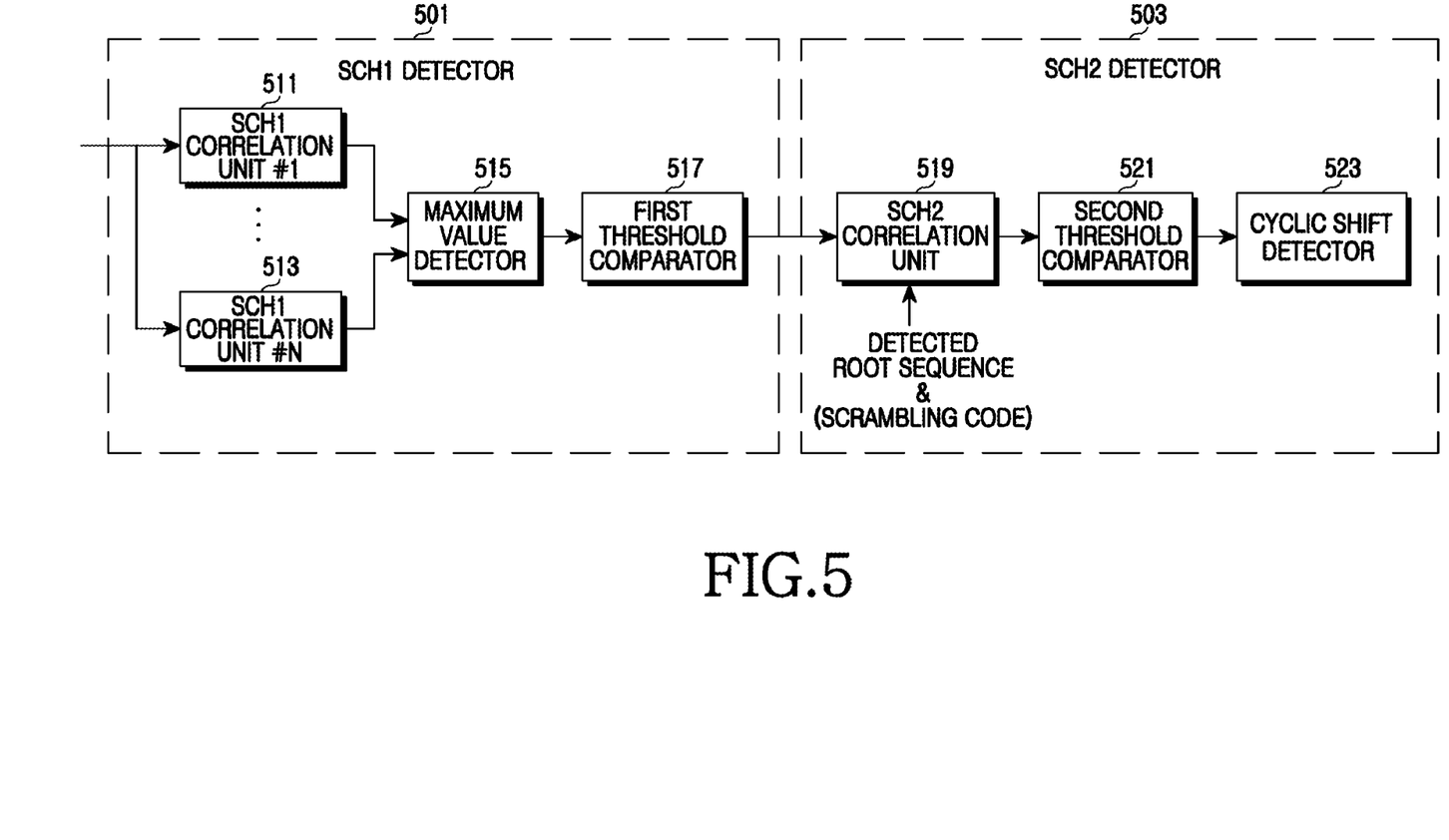
FIG. 5 is a block diagram illustrating a receiver for performing cell searching in a wireless communication system according to an exemplary embodiment of the present invention.

FIG. 5 is a block diagram illustrating a receiver for performing cell searching in a wireless communication system according to an exemplary embodiment of the present invention.

Referring to FIG. 5, the receiver includes two cell searching blocks, that is, an SCH1 detector 501 and an SCH2 detector 503. The SCH1 detector 501 includes N SCH1 correlation units 511 and 513, a maximum value detector 515, and a first threshold comparator 517. The SCH2 detector 503 includes an SCH2 correlation unit 519, a second threshold comparator 521, and a cyclic shift detector 523.

The N SCH1 correlation units 511 and 513 perform correlation on X root sequences transmitted in the SCH1 of FIG. 1 to detect one sequence for each of the SCH1 correlation units 511 and 513, where N is a specific number. Each of the SCH1 correlation units 511 and 513 performs correlation on an available root sequence and outputs the correlation result to the maximum value detector 515. If a speed of the correlation operation is fast, the number of the SCH1 correlation units 511 and 513 can be X, where X is less than N.

The maximum value detector 515 detects a maximum value among the input root sequences, and outputs the detected maximum value to the first threshold comparator 517.

The first threshold comparator 517 compares the maximum correlation value received from the maximum value detector 515 with a preset first threshold and determines an availability of a root sequence corresponding to the maximum correlation value. If the maximum correlation value is greater than the first threshold, the first threshold comparator 517 determines that the root sequence is available, and then obtains the first part of the cell ID and slot timing from the root sequence. Otherwise, if the maximum correlation value is less than or equal to the first threshold, the first threshold comparator 517 determines that the root sequence is unavailable, and then compares the maximum correlation value with a third threshold. If the maximum correlation value is greater than the third threshold, the first threshold comparator 517 stores the maximum correlation value, and then combines the maximum correlation value with a second maximum correlation value. An average value of the two correlation values are obtained to be used instead of the second maximum correlation value.

The SCH2 correlation unit 519 performs correlation on two SCH2s included in two consecutive slots in order to detect a sequence that is cyclic shifted in the SCH2 by an arbitrary value from the root sequence detected by the SCH1 detector 501. If the transmitter performs scrambling on the root sequence according to a mapping rule, the SCH2 correlation unit 519 performs descrambling by using a scheduling code used in the transmitter and thereafter performs correlation on the SCH2. In this case, to reduce the complexity of implementation, one of the N SCH1 correlation units 511 and 513 can be shared and used in the correlation operation for the SCH2.

The second threshold comparator 521 compares the correlation value received from the SCH2 correlation unit 519 with a second threshold to determine an availability of the correlation value. If the correlation value is greater than the second threshold, the second threshold comparator 521 provides two complex sequences corresponding to the correlation value to the cyclic shift detector 523.

The cyclic shift detector 523 detects two cyclic shift indices that indicate differences between the root sequence and the two complex sequences, and thus obtains frame timing and the second part of the cell ID. The second part of the cell ID is mapped to a combination of 'a' and 'b', each of which indicates a difference from the root sequence.

The receiver of FIG. 5 may detect only one root sequence or two root sequences from the SCH1 according to a cell ID mapping scheme. In the case of detecting two root sequences, the SCH1 detector 501 performs root sequence detection two times, and the SCH2 detector 503 detects a complex sequence depending on each root sequence. When the complex sequence is detected from an SCH2 of a specific slot, among the two root sequences, the SCH2 detector 503 uses a root sequence detected in the same slot. In the case of detecting two root sequences, the SCH1 detector 501 can obtain not only slot timing but also frame timing.

In addition, in the structure of FIG. 5, a Fast Fourier Transform (FFT) operator may optionally be used if a mapping domain of the SCH1 and the SCH2 is changed to a frequency domain.

Figure 6:
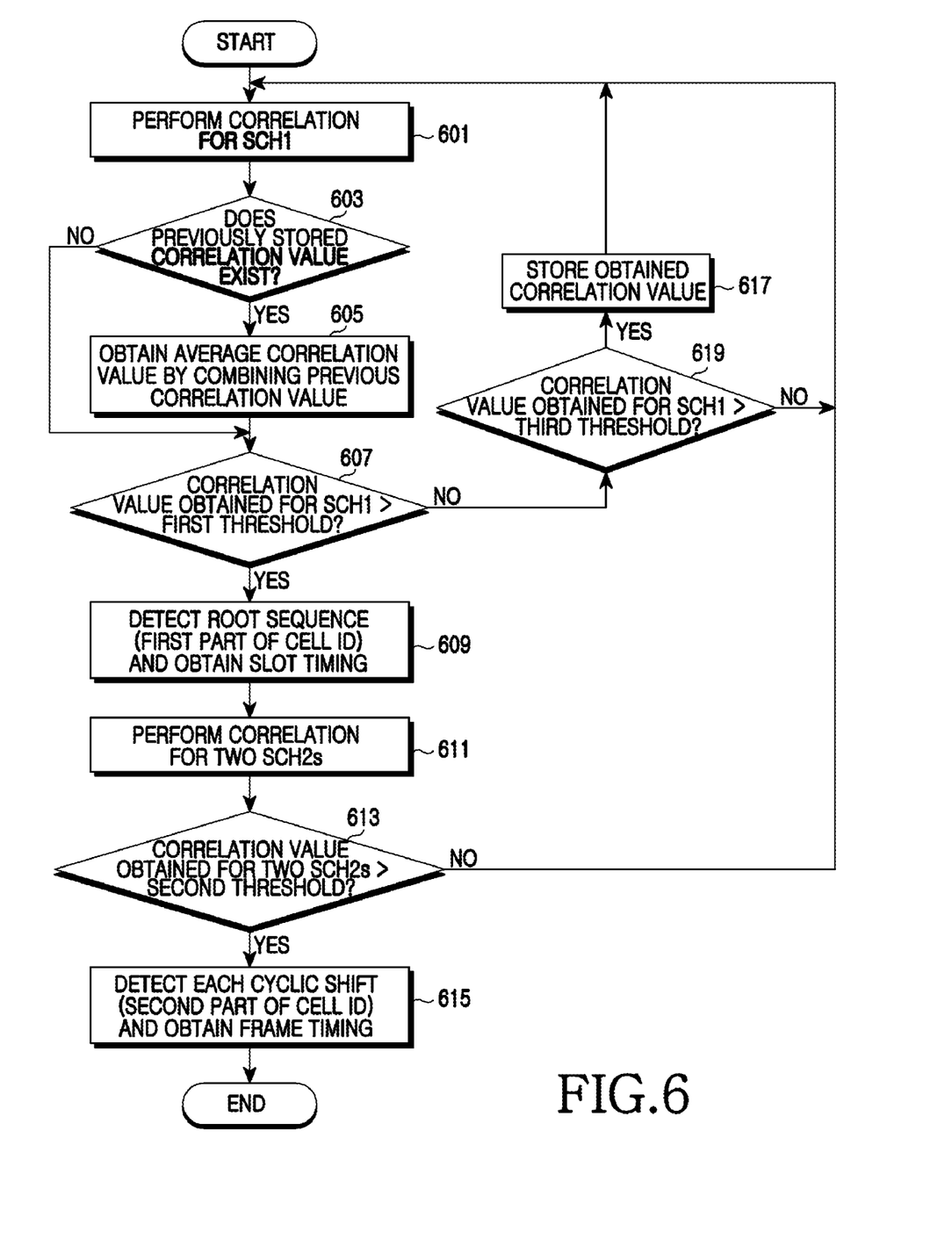
FIG. 6 is a flowchart illustrating a cell searching process in a receiver of a wireless communication system according to an exemplary embodiment of the present invention.

FIG. 6 is a flowchart illustrating a cell searching process in a receiver of a wireless communication system according to an exemplary embodiment of the present invention.

Referring to FIG. 6, in step 601, for cell searching, the receiver performs correlation on an available root sequence for a repeatedly transmitted SCH1, and then selects a maximum correlation value from correlation values for the SCH1.

In step 603, the receiver determines if a previously stored correlation value exists. If the previously stored correlation value does not exist, proceeding to step 607, the receiver compares the maximum correlation value obtained for the SCH1 with a first threshold. Otherwise, if the previously stored correlation value exists, proceeding to step 605, the receiver obtains an average correlation value by combining the maximum correlation value and the previously stored correlation value. In step 607, the receiver compares the obtained average correlation value with the first threshold.

If the maximum correlation value or the average correlation value is less than or equal to the first threshold in step 607, proceeding to step 619, the receiver compares the maximum correlation value or the average correlation value with a third threshold. If the correlation value is less than or equal to the third threshold, the procedure returns to step 601. Otherwise, if the correlation value is greater than the third threshold, proceeding to step 617, the receiver stores the correlation value, and then the procedure returns to step 601.

If the maximum correlation value or the average correlation value is greater than the first threshold in step 607, proceeding to step 609, the receiver detects a root sequence corresponding to the maximum correlation value from the SCH1, and detects a first part of a cell ID from an index of the root sequence. Thereafter, the receiver obtains slot timing, and the procedure proceeds to step 611.

In step 611, the receiver performs correlation for two SCH2s respectively included in two consecutive slots. In step 613, the receiver compares the correlation value for the two SCH2s with a second threshold. If the correlation value is less than or equal to the second threshold, the procedure returns to step 601. Otherwise, if the correlation value is greater than the second threshold, proceeding to step 615, the receiver obtains a second part of the cell ID by detecting two cyclic shift indices which indicate differences between the root sequence and complex sequences included in the two SCH2s. Thereafter, the receiver obtains frame timing, and then the procedure of FIG. 6 ends.

Figure 7:
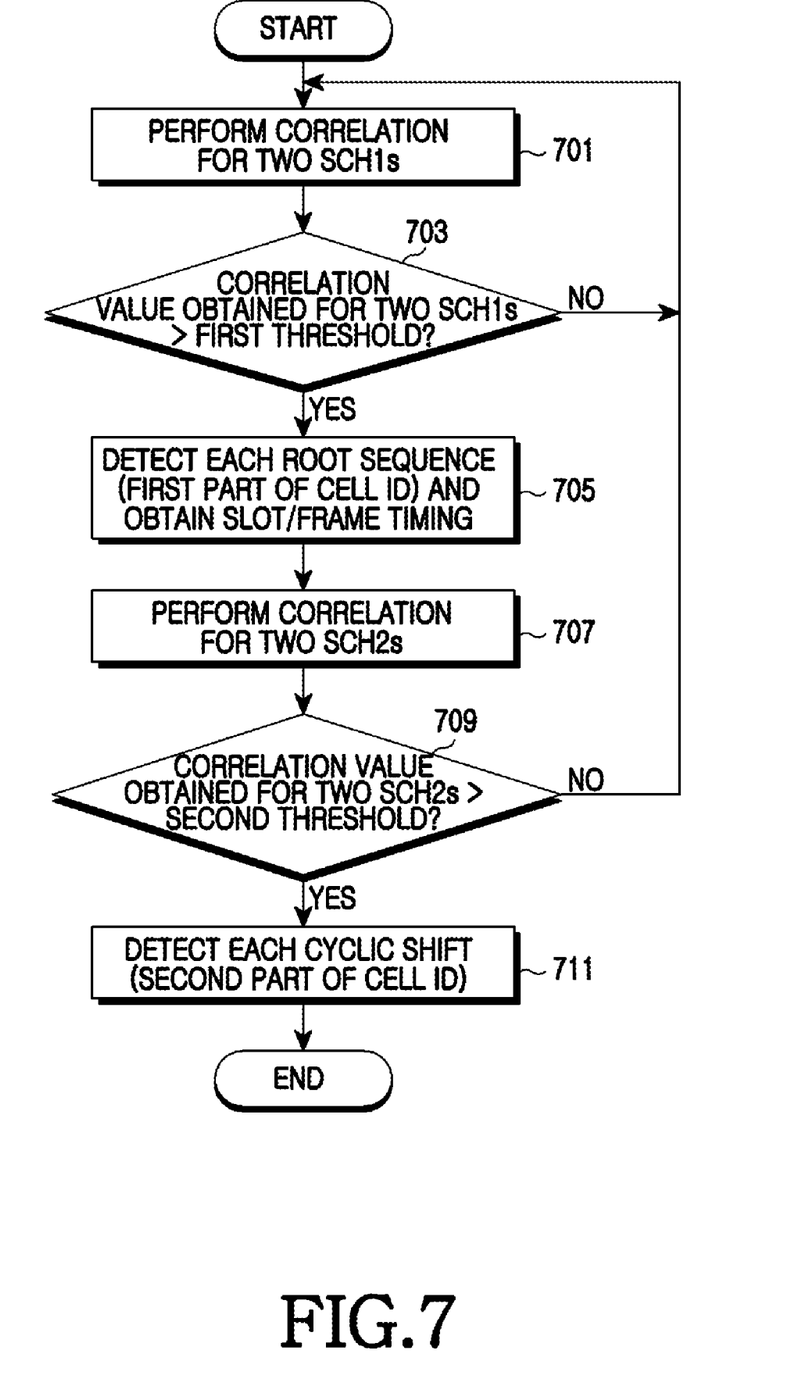
FIG. 7 is a flowchart illustrating a cell searching process in a receiver of a wireless communication system according to another exemplary embodiment of the present invention.

FIG. 7 is a flowchart illustrating a cell searching process in a receiver of a wireless communication system according to another exemplary embodiment of the present invention.

Referring to FIG. 7, in step 701, for cell searching, the receiver performs correlation on an available root sequence for two SCH1s included in two consecutive slots, and thereafter selects a maximum correlation value from correlation values of the respective SCH1s. That is, the receiver performs correlation for the two SCH1s and selects the maximum correlation value from each SCH1, thereby obtaining two correlation values.

In step 703, the receiver compares the obtained two correlation values with a first threshold. If the two correlation values are less than or equal to the first threshold, the procedure returns to step 701. Otherwise, if the two correlation values are greater than the first threshold, proceeding to step 705, the receiver detects root sequences corresponding to the two obtained correlation values from the SCH1s, and detects a first part of a cell ID from an index of each root sequence. Then, the receiver obtains slot/frame timing.

In step 707, the receiver performs correlation for the two SCH2s respectively included in the two consecutive slots in which the root sequences are detected. In step 709, the receiver compares the correlation values for the two SCH2s with a second threshold.

If the correlation values are less than or equal to the second threshold, the procedure returns to step 701. Otherwise, if the correlation values are greater than the second threshold, proceeding to step 711, the receiver obtains a second part of the cell ID by detecting two cyclic shift indices that indicate differences between the two root sequences and complex sequences included in the two SCH2s. Thereafter, the procedure of FIG. 7 ends.

In the above descriptions corresponding to FIGS. 1 to 7, the SCH1 is used to detect the first part of the cell ID and the SCH2 is used to detect the second part of the cell ID. However, the SCH2 may be used to detect the first part of the cell ID and the SCH1 may be used to detect the second part of the cell ID.

Hereinafter, a method of performing cell searching, for example, using a Zadoff-Chu (ZC) sequence that is one of CAZAC-type complex sequences will be described based on the above descriptions corresponding to FIGS. 1 to 7. A wireless communication system to be described below has a frame structure of a Long Term Evolution (LTE) system which repeatedly transmits a Primary Synchronization CHannel (PSCH) and a Secondary Synchronization CHannel (SSCH) in every duration as illustrated in FIG. 8.

Figure 8:
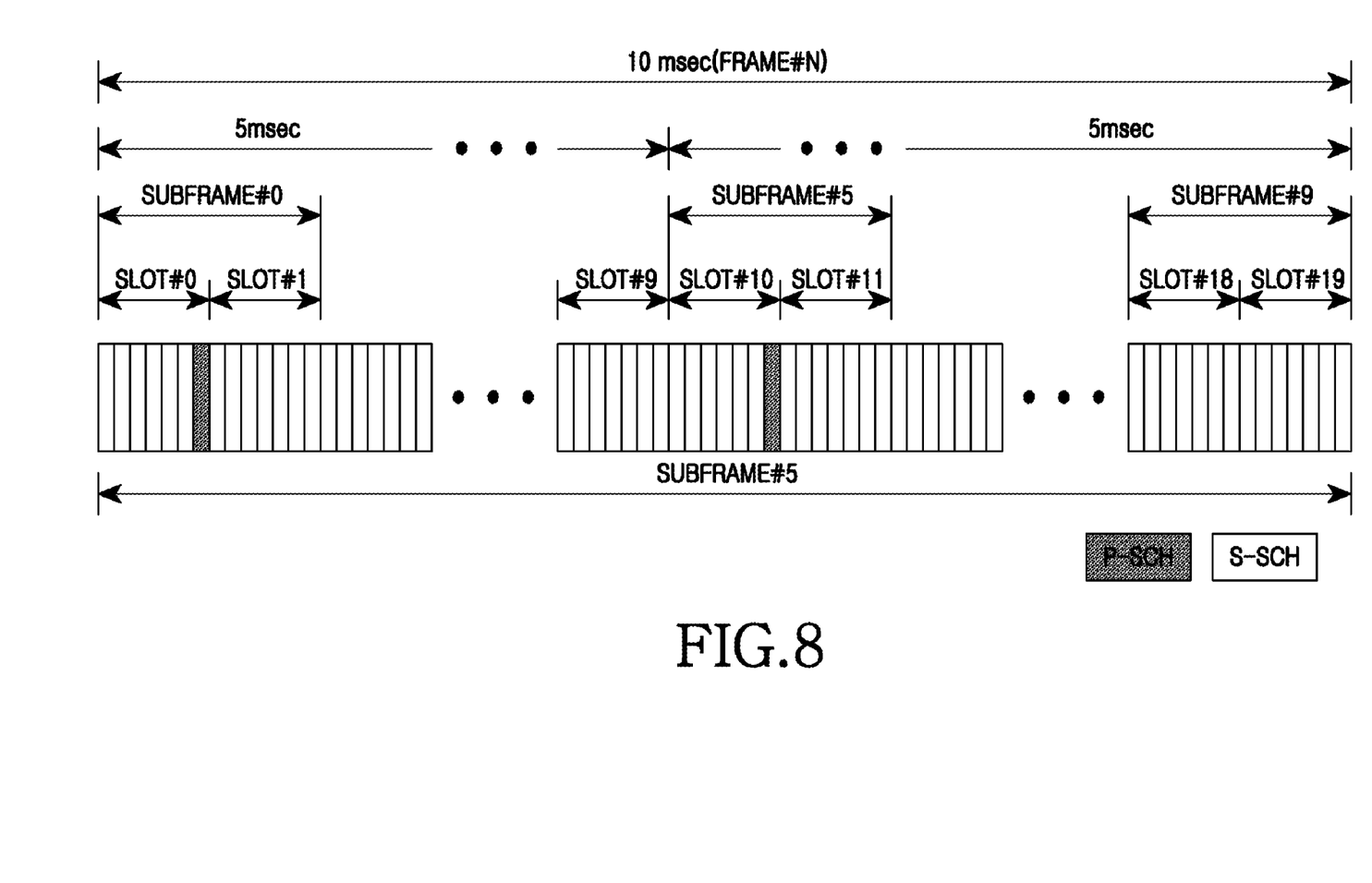
FIG. 8 illustrates a structure of a downlink physical channel for initial cell searching in a Long Term Evolution (LTE) system according to an exemplary embodiment of the present invention.

FIG. 8 illustrates a structure of a downlink physical channel for initial cell searching in a Long Term Evolution (LTE) system according to an exemplary embodiment of the present invention.

The ZC sequence is a complex sequence that satisfies a CAZAC characteristic with respect to an arbitrary sequence length N. The ZC sequence is generated by Equation (2) below for two cases, that is, when N is odd and when N is even.

$$q_k = CW_N^{k^2/2+q \cdot k}, \quad k = 0, 1, 2, L, N-1, \text{ for } N \text{ even} \quad (2)$$

$$q_k = CW_N^{k(k+1)/2+q \cdot k}, \quad k = 0, 1, 2, L, N-1, \text{ for } N \text{ odd}$$

-continued
$$W_N = \exp\left(-j\frac{2\pi p}{N}\right)$$

In Equation (2), $q_k$ denotes a $k^{th}$ sequence, N denotes a sequence length, p denotes a sequence index, and q denotes a cyclic shift index. The sequence index p and the sequence length N are relatively prime to each other. The cyclic shift index q is an arbitrary integer.

Figure 9:
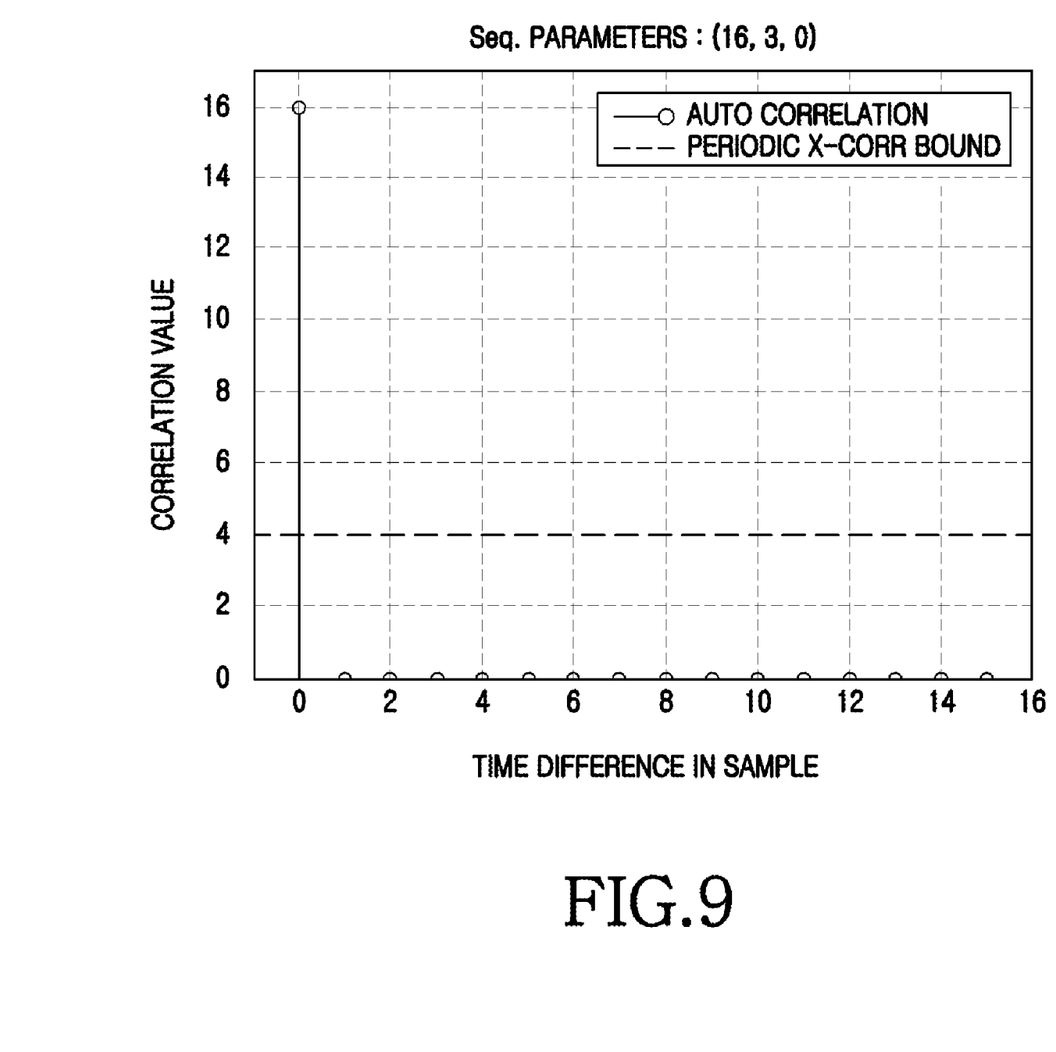
FIG. 9 is a graph illustrating a periodic auto-correlation characteristic of a Zadoff-Chu sequence according to an exemplary embodiment of the present invention.

FIG. 9 is a graph illustrating a periodic auto-correlation characteristic of a Zadoff-Chu sequence according to an exemplary embodiment of the present invention.

Referring to FIG. 9, the ZC sequence has a periodic auto-correlation characteristic in which correlation values are not zero if synchronization is correctly achieved whereas the correlation values are zero if synchronization is not achieved.

Figure 10:
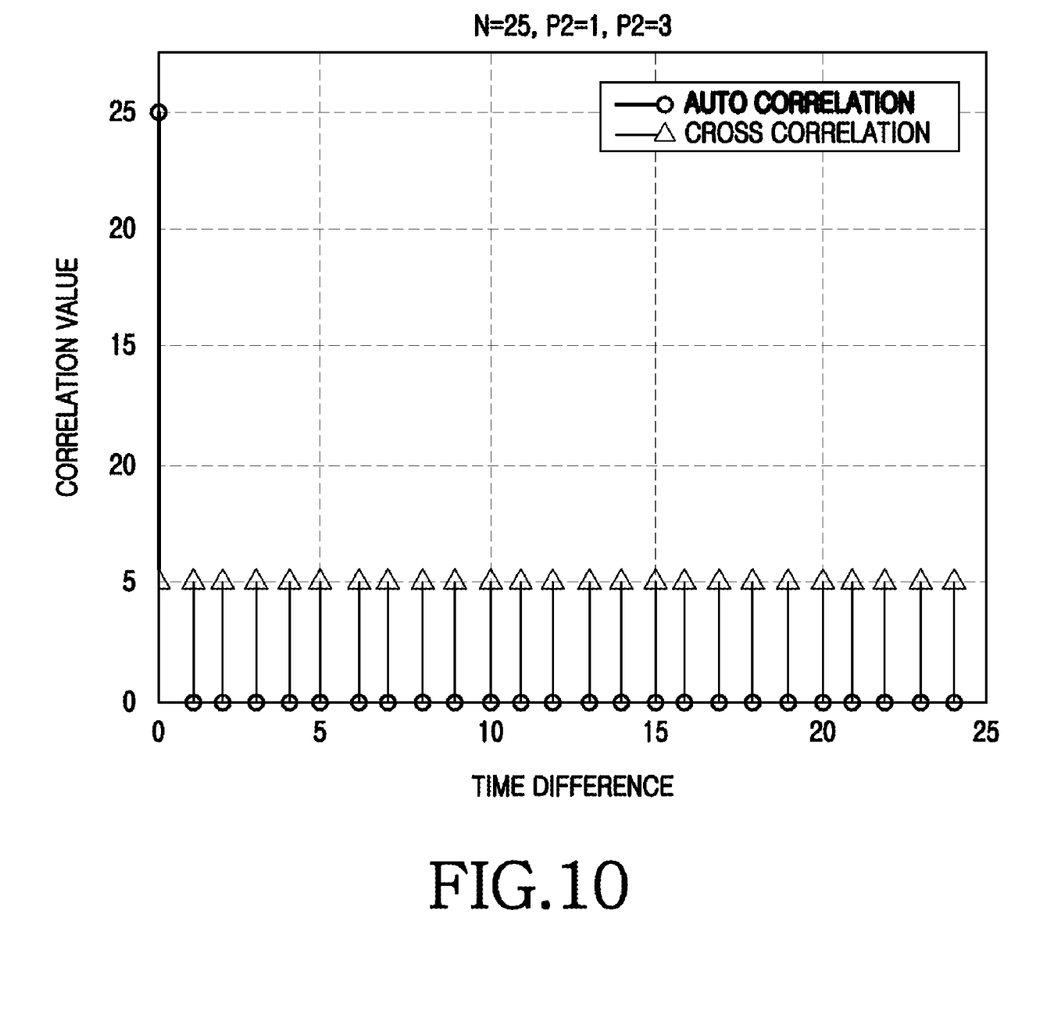
FIG. 10 is a graph illustrating a periodic cross-correlation characteristic of a Zadoff-Chu sequence according to an exemplary embodiment of the present invention.
Figure 11:
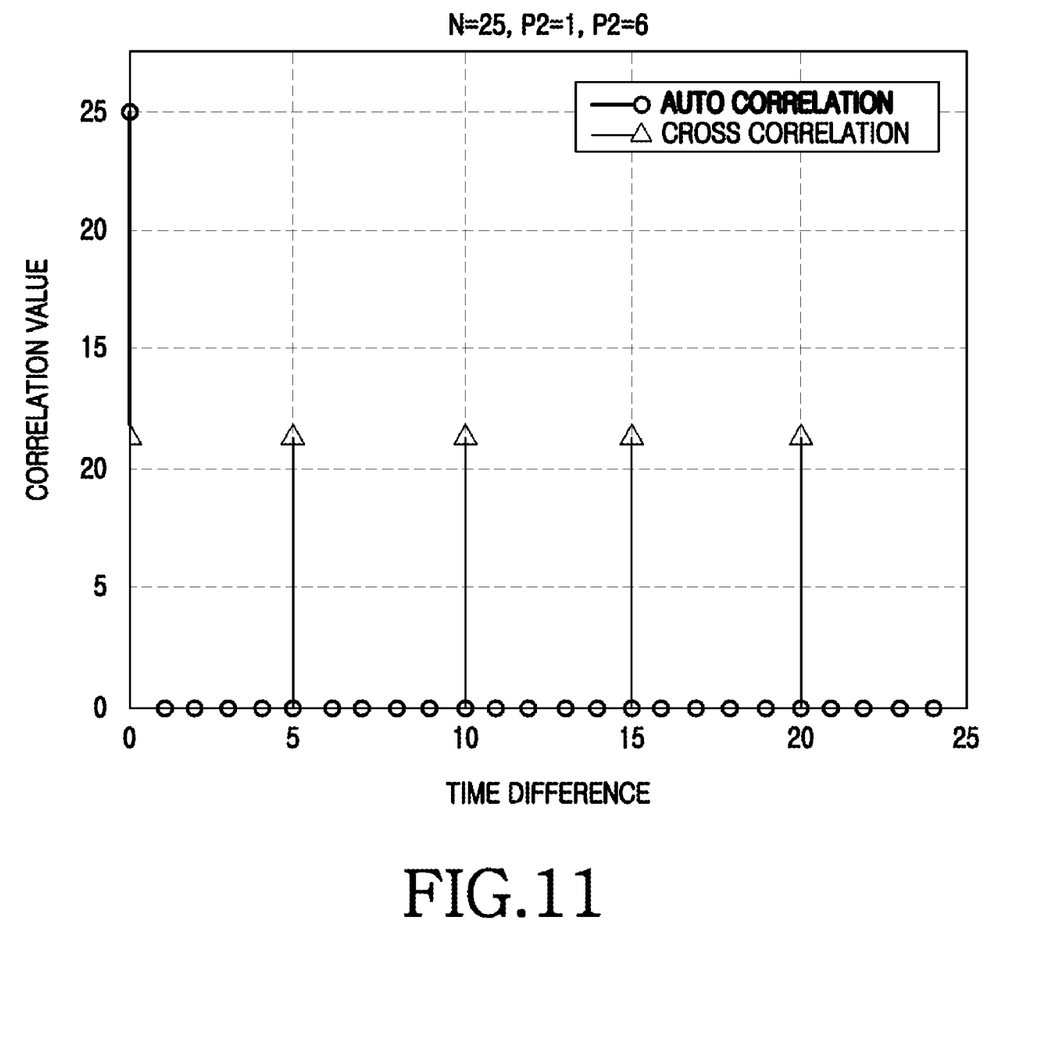
FIG. 11 is a graph illustrating a periodic correlation characteristic of a Zadoff-Chu sequence according to an exemplary embodiment of the present invention.
Figure 12:
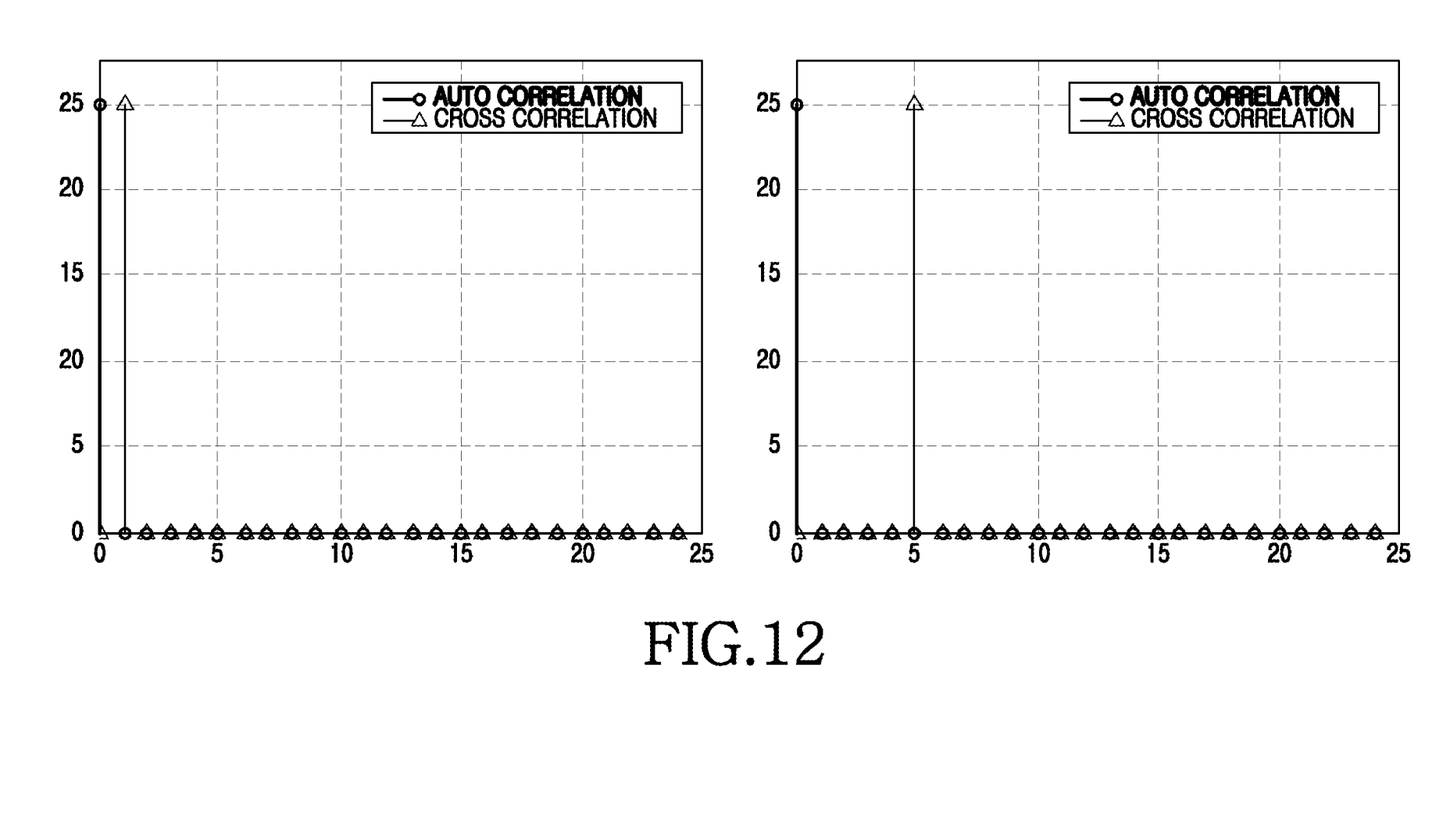
FIG. 12 is a graph illustrating a correlation characteristic of a Zadoff-Chu sequence according to an exemplary embodiment of the present invention.

FIG. 10 is a graph illustrating a periodic cross-correlation characteristic of a Zadoff-Chu sequence according to an exemplary embodiment of the present invention. FIG. 11 is a graph illustrating a periodic correlation characteristic of a Zadoff-Chu sequence according to an exemplary embodiment of the present invention. FIG. 12 is a graph illustrating a correlation characteristic of a Zadoff-Chu sequence according to an exemplary embodiment of the present invention.

Referring to FIGS. 10 and 11, according to a relationship between the sequence length and the sequence index, that is, according to whether the two values are relatively prime to each other, the ZC sequence has a cross-correlation characteristic. For example, it is assumed that two ZC sequences have sequence indices p1 and p2, respectively, and have the sequence length N. In this case, if the sequence length N and a 'p1−p2' (i.e., a difference between the sequence indices p1 and p2) are relatively prime to each other, as illustrated in FIG. 10, a cross-correlation value between the two sequences is constantly maintained to $\sqrt{N}$. Otherwise, if the sequence length N and the 'p1−p2' are not relatively prime to each other, as illustrated in FIG. 11, there is a cross-correlation value higher than $\sqrt{N}$, which may increase a probability of a false alarm.

Consequently, if all combinations of the sequence length N and the 'p1−p2' satisfy a relatively prime relationship, a cross-correlation value is constantly maintained to $\sqrt{N}$ for all delays. Therefore, an exemplary embodiment of the present invention determines and uses a sequence in which the two values are relatively prime to each other. That is, the sequence length N may be selected as a prime number so that combinations of all possible (N−1) ZC sequences are used. Alternatively, if the sequence length N is not a prime number, the sequence length N may be selected so that a cross-correlation value of the sequence index combination in use is $\sqrt{N}$.

The cyclic shift index q of the ZC sequence is used to shift a correlation characteristic of the ZC sequence generated using the arbitrary sequence index p. For example, if the two ZC sequences have the same sequence index (i.e., p1=p2) and different cyclic shift indices (i.e., q1≠q2), a cross-correlation characteristic between the two ZC sequences results in the graph of FIG. 12 in which an auto-correlation characteristic is shifted along a time axis.

That is, only the ZC sequence having the characteristic of the PSCH and the SSCH illustrated in FIG. 8 are used for cell searching. There are two cell searching methods, which will be described below.

The two cell searching methods apply ZC sequences, each of which has the sequence length of N, to the PSCH and the SSCH which are physical channels.

In the first cell searching method, a transmitter continuously assigns a root sequence to the PSCH, wherein the root sequence has the arbitrary sequence index p which is relatively prime to the sequence length N. Then, the receiver detects the root sequence by using the PSCH and thus detects Orthogonal Frequency Division Multiplexing (OFDM) symbol timing and the cell ID included in a cell group. Although up to m cell group IDs can be identified, only some of them may be used by considering a correlation characteristic.

The transmitter repeatedly assigns two ZC sequences to the SSCH, wherein the two ZC sequences respectively have the same sequence indices as the two root sequences and have the cyclic shift indices q1 and q2 for the two root sequences. If the cyclic shift index of the root sequence is 'a', each of 'a-q1' and 'a-q2' is relatively prime to the sequence length N. Then, the receiver detects the two ZC sequences from the SSCH and thus detects the cell group ID and frame timing according to combinations of 'a-q1' and 'a-q2', each of which indicates a difference between a corresponding cyclic shift index and the root index.

In the second cell searching method, the transmitter continuously assigns two different root sequences to the PSCH, wherein the two different root sequences are included in m root sequences having the arbitrary sequence index p which is relatively prime to the sequence length N. Then, the receiver detects the two root sequences by using the PSCH and thus detects OFDM symbol timing and the cell ID included in a cell group. Additionally, the receiver detects frame timing. Although up to m cell group IDs can be identified, only some of them may be used by considering a correlation characteristic.

Further, the transmitter repeatedly assigns two ZC sequences to the SSCH, wherein the two ZC sequences respectively have the same sequence indices as the two root sequences and have the cyclic shift indices q1 and q2 for the two root sequences. If the cyclic shift index of the two root sequences is 'a', each of 'a-q1' and 'a-q2' is relatively prime to the sequence length N. Then, the receiver detects the two ZC sequences from the SSCH and thereby detects the cell group ID and frame timing according to combinations of 'a-q1' and 'a-q2', each of which indicates a difference between a corresponding cyclic shift index and each root index.

According to exemplary embodiments of the present invention, a transmitter of an asynchronous wireless communication system performs cell searching by using a complex sequence. Therefore, since a correlation unit and a sequence generator can be reused unlike the conventional case, complexity of hardware implementation can be reduced. In addition, complexity of cell searching can be reduced by performing two steps of SCH searching. Further, since cell ID information is transmitted by considering a difference between cyclic indices of two SCHs, exemplary embodiments of the present invention can be advantageous in detecting errors caused by a frequency offset. Thus, exemplary embodiments of the present invention are effective in a cell searching operation performed before the frequency offset is compensated for. More particularly, a frequency offset estimation operation for selecting an FFT window is unnecessary in a system based on an OFDM scheme. Furthermore, a higher detection probability can be obtained in comparison with the conventional method by combining correlation values of the two SCHs. That is, there is an advantage in that an acquisition and detection time can be reduced with the same detection probability.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A method of mapping a cell IDentifier (ID) for cell searching in a transmitter of a wireless communication system, the method comprising:
   generating a single type of complex sequences mapped with a cell ID; and
   transmitting the complex sequences mapped with the cell ID to synchronization channels periodically transmitted in each slot of a physical frame,
   wherein the generating of the single type of complex sequences comprises:
      generating a root sequence having a sequence index mapped to a first part of the cell ID; and
      generating two complex sequences having the same sequence index as the root sequence and having a cyclic shift index mapped to a second part of the cell ID.

2. The method of claim 1, wherein the generating of the single type of complex sequences further comprises generating another root sequence having a sequence index mapped to a first part of the cell ID.

3. The method of claim 1, wherein the two complex sequences are cyclic shifted respectively by different values from the root sequence.

4. The method of claim 1, wherein the second part of the cell ID is mapped to a combination of differences between the root sequence and the complex sequences.

5. The method of claim 1, wherein the complex sequence is any one of a Constant Amplitude Zero Auto-Correlation (CAZAC) sequence and a poly-phase sequence in which a phase component has a sequence feature.

6. The method of claim 1, wherein the transmitting of the complex sequences to the synchronization channels comprises:
   repeatedly transmitting to a first synchronization channel a root sequence mapped to a first part of the cell ID among the complex sequences; and
   repeatedly transmitting to a second synchronization channel two complex sequences mapped to a second part of the cell ID among the complex sequences.

7. A method of cell searching in a receiver of a wireless communication system, the method comprising:
   detecting a root sequence by performing correlation for a first synchronization channel periodically received in each slot of a physical frame;
   obtaining a first part of a cell ID from the root sequence;
   detecting a complex sequence which is a same type as the root sequence by performing correlation for a second synchronization channel periodically received in each slot of the physical frame; and
   obtaining a second part of the cell ID by using the complex sequence,
   wherein the first part of the cell ID is obtained from a sequence index of the root sequence, and the second part of the cell ID is obtained from a combination of cyclic shift indices that indicate differences between the root sequence and two complex sequences.

8. The method of claim 7, wherein the detecting of the root sequence by performing correlation for the first synchronization channel comprises:
   performing correlation on the root sequence for the first synchronization channel; and
   obtaining the root sequence by comparing a maximum correlation value among correlation result values with a first threshold.

9. The method of claim 7,
   wherein the detecting of the root sequence comprises comparing a correlation value with a first threshold, and
   wherein the detecting of the complex sequence by performing correlation for the second synchronization channel comprises:
      performing correlation for two second synchronization channels included in two consecutive slots; and
      obtaining two complex sequences by comparing the correlation result values from the performed correlation for the two second synchronization channels and a second threshold.

10. The method of claim 7, wherein the complex sequence is any one of a Constant Amplitude Zero Auto-Correlation (CAZAC) sequence and a poly-phase sequence in which a phase component has a sequence feature.

11. An apparatus of mapping a cell ID for cell searching in a transmitter of a wireless communication system, the apparatus comprising:
   a complex sequence generator for generating a single type of complex sequences mapped with a cell ID;
   a resource mapper for transmitting the complex sequences mapped with the cell ID to synchronization channels periodically transmitted in each slot of a physical frame;
   a table for generating a sequence index mapped to a first part of the cell ID; and
   a cyclic shift index table for generating a cyclic shift index mapped to a second part of the cell ID,
   wherein the complex sequence generator generates a root sequence having the generated sequence index and generates two complex sequences which are different by the cyclic shift index from the generated root sequence.

12. The apparatus of claim 11, wherein the complex sequence generator generates another root sequence having the generated sequence index.

13. The apparatus of claim 11, wherein the two complex sequences are cyclic shifted respectively by different values from the root sequence.

14. The apparatus of claim 11, wherein the second part of the cell ID is mapped to a combination of differences between the root sequence and the complex sequences.

15. The apparatus of claim 11, wherein the complex sequence is any one of a Constant Amplitude Zero Auto-Correlation (CAZAC) sequence and a poly-phase sequence in which a phase component has a sequence feature.

16. The apparatus of claim 11, wherein the resource mapper repeatedly transmits to a first synchronization channel a root sequence mapped to a first part of the cell ID, and repeatedly transmits to a second synchronization channel two complex sequences mapped to a second part of the cell ID.

17. An apparatus for cell searching in a receiver of a wireless communication system, the apparatus comprising:
   a first synchronization channel detector for obtaining a root sequence by performing correlation for a first synchronization channel periodically received in each slot of a physical frame and for obtaining a first part of a cell ID from the obtained root sequence; and
   a second synchronization channel detector for detecting a complex sequence which is a same type as the root sequence by performing correlation for a second synchronization channel periodically received in each slot of the physical frame and for obtaining a second part of the cell ID by using the detected complex sequence,
   wherein the first part of the cell ID is obtained from a sequence index of the root sequence, and the second part of the cell ID is obtained from a combination of cyclic shift indices that indicate differences between the root sequence and two complex sequences.

18. The apparatus of claim 17, wherein the first synchronization channel detector comprises:
   a plurality of sequence correlation units, each of which detects one sequence by performing correlation for a plurality of root sequences transmitted in the first synchronization channel;
   a maximum value detector for detecting a maximum correlation value among a plurality of correlation values obtained by the plurality of sequence correlation units; and
   a threshold comparator for obtaining the root sequences by comparing the detected maximum correlation value with a first threshold.

19. The apparatus of claim 17, wherein the first synchronization channel detector comprises:
   a first synchronization channel correlation unit for determining a maximum correlation value; and
   a first threshold comparator that compares the maximum correlation value with a first threshold,
   wherein the second synchronization channel detector comprises:
      a second synchronization channel correlation unit for performing correlation for two second synchronization channels included in two consecutive slots;
      a second threshold comparator for obtaining two complex sequences by comparing a correlation value provided from the second synchronization correlation unit with a second threshold; and
      a cyclic shift detector for detecting a cyclic shift index which indicates a difference between the root sequence and the two complex sequences.

* * * * *